United States Patent [19]
Andersson

[11] Patent Number: 5,935,352
[45] Date of Patent: *Aug. 10, 1999

[54] PROCESS FOR PRODUCTION OF A STEEL COMPONENT

[75] Inventor: Jan-Erik Andersson, Falun, Sweden

[73] Assignee: Ovako Steel AB, Hofors, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,576

[22] Filed: May 19, 1997

[30] Foreign Application Priority Data

May 21, 1996 [SE] Sweden .................................. 9601912

[51] Int. Cl.$^6$ ........................................................ C21C 9/00
[52] U.S. Cl. ............................................ 148/575; 148/567
[58] Field of Search ...................................... 148/567, 575

[56] References Cited

U.S. PATENT DOCUMENTS 2,326,674  4/1943  Pavitt .

FOREIGN PATENT DOCUMENTS

| 1 069 222 | 7/1954 | France . |
| 1 441 317 | 7/1966 | France . |
| 2 190 926 | 2/1974 | France . |
| 24 49 237 | 4/1976 | Germany . |
| 49/065318 | 6/1974 | Japan . |
| 52/068017 | 6/1977 | Japan . |
| 52/068019 | 6/1977 | Japan . |
| 52/116716 | 9/1977 | Japan . |
| 1084692 | 9/1967 | United Kingdom .................... 148/575 |

OTHER PUBLICATIONS

Bogolyubskii et al,; "Effect of Different Heat Treatment Regimes on the Structure and Properties of Martensitic Steel 90Kh18M"; Metal Science and Heat Treatment, vol. 33, No. 1/02, Jan. 1, 1991.

Patent Abstracts of Japan: vol. 96, No. 1; publication No. 07238348 (abstract of application No. 06052929) (Sanyo Special Steel Co. Ltd.); publ. date Dec. 9, 1995.

Patent Abstracts of Japan: vol. 018, No. 430; publication No. 06128700 (abstract of application No. 04300349) (Hitachi Metals Ltd.); publ. date Dec. 5, 1994.

*Primary Examiner*—Deborah Yee
*Attorney, Agent, or Firm*—Burns, Doane, Swecker & Mathis, L.L.P.

[57] ABSTRACT

A process for production of a steel component having a hard, carbon rich dissolved surface and a tough, low carbon dissolved core, incorporating the following steps:

using an alloyed steel with a carbon content of 0.3%–1.2% C and with an alloy element acting as a strong carbide former; and subjecting a component formed from this material to induction heating, whereby the core is heated to a level in the lower region of the austenite area, thereby creating a certain dissolved low carbon level in the component core, and rapidly heating the surface region to a higher region within the austenite area, thereby creating a high dissolved carbon content in the surface region of the component.

8 Claims, 2 Drawing Sheets

PROCESS FOR PRODUCTION OF A STEEL COMPONENT

BACKGROUND OF THE INVENTION

Case-hardening (carburization) is often used to produce components which are subjected to fatigue stresses. This carburization gives the component a hard, carbon-rich surface at the same time as a tough, low-carbon core is obtained after hardening and annealing. Such a component has a very good resistance to wear and fatigue. The profile of hardness/residual stress obtained is schematically illustrated in the accompanying FIG. 1, and the surface residual stresses obtained are very favorable from a fatigue life point of view.

However, case-hardening is a rather expensive and slow process. Therefore, many attempts have been made to make components with acceptable wear and fatigue resistance by surface hardening using induction heating. In such attempts, a low-alloyed steel having a higher content of carbon, e.g., 0.5%–0.6%, is normally used and the surface zone of the component is heated rapidly, whereupon the component is subjected to quenching. The profile of hardness/residual stress then obtained is illustrated schematically in the accompanying FIG. 2.

This profile of hardness/residual stress obtained from a surface induction hardened component in combination with the low alloy steels used is sufficient in several situations, but often gives a limited contact fatigue strength. It also gives rise to problems under other fatigue conditions. One factor contributing to the often inferior properties is the reduction of hardness which is experienced at a distance below the surface of the material. Another is that most of the positive residual stresses are concentrated to the same depth. This occurs especially when using a medium hard core.

The martensite formed by conventional induction heating using a low-alloyed steel will almost immediately reach the full carbon content, i.e., 0.5%–0.6%.

OBJECTS AND SUMMARY OF THE INVENTION

It is an object of this invention to avoid or alleviate the problems of the prior art.

An object of the present invention is to provide a process using induction hardening, thereby giving a more inexpensive and more rapid result than case-carburization, but which eliminates the drawbacks earlier experienced with induction hardening.

It is an aspect of the present invention to provide a process for the production of a steel component having a hard, carbon rich surface and a tough, low carbon core comprising induction heating a component formed from an alloyed steel with a carbon content of 0.3%–1.2% C and containing a strong carbide former so that the core is heated to the lower region of the austenite area, thereby creating a certain dissolved carbon level in the component core, and heating the surface region to a higher region within the austenite area, thereby creating a high dissolved carbon content in the surface region of the component.

DETAILED DESCRIPTION OF THE PREFERRED EMBODIMENTS OF THE INVENTION

Figure 3:
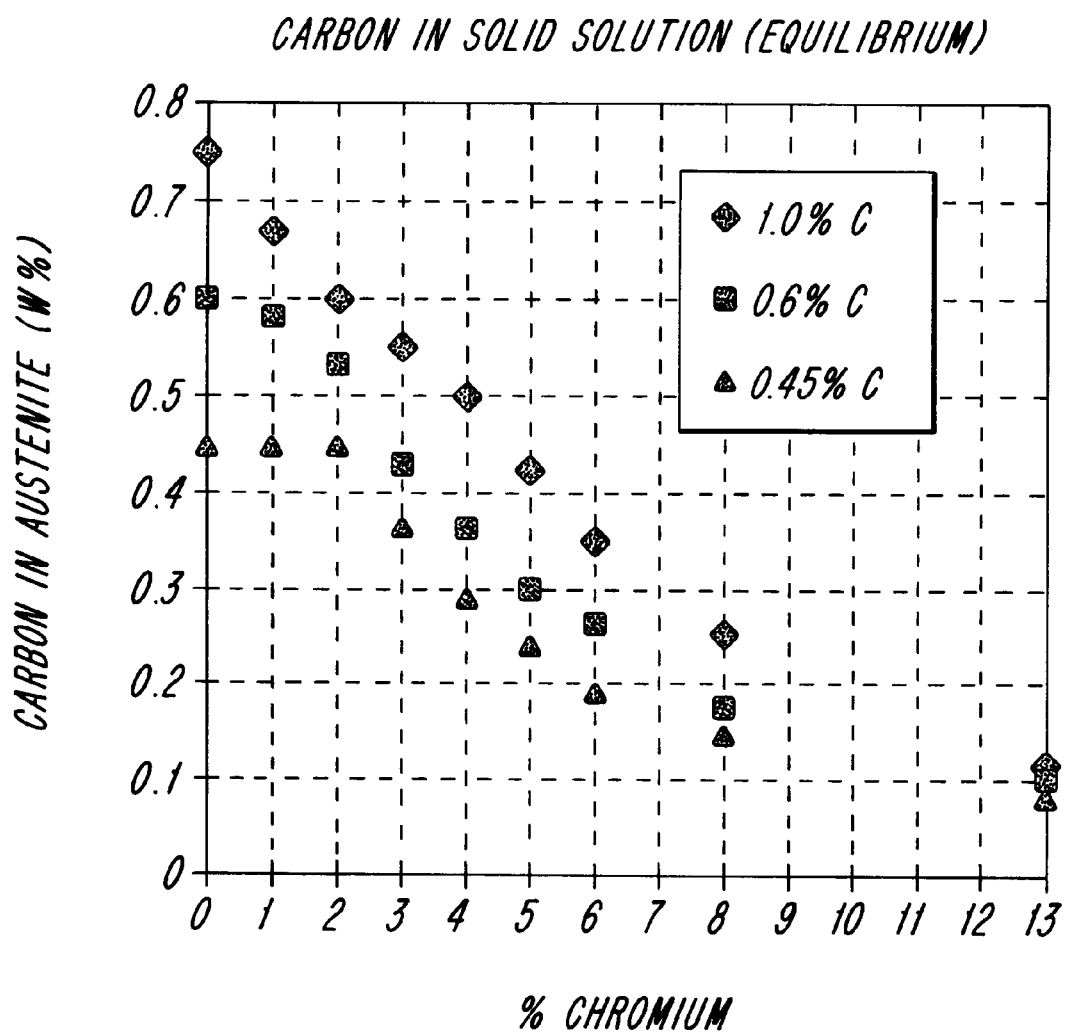
FIG. 3 is a graph of % chromium vs. carbon in austenite for various carbon contents.

In order to obtain an acceptable component, there is provided a process adapted to give a result resembling to that obtained with case-carburizing, i.e., with a core having a solid dissolved carbon content of 0.1%–0.5%, and a surface layer having a carbon content of 0.5%–1.2%. For this purpose, an alloyed steel is used which is tailored for giving such a result. This is obtained by using steel having a carbon content of 0.3–1.2% and increasing the content of a strong carbide former, such as, e.g., chromium, whereby the austenite solid dissolved carbon content can be reduced, such as illustrated in the graph according to FIG. 3. Other conventional strong carbide formers such as molybdenum, tungsten, tantalum, vanadium or the like, can also be used.

Figure 1:
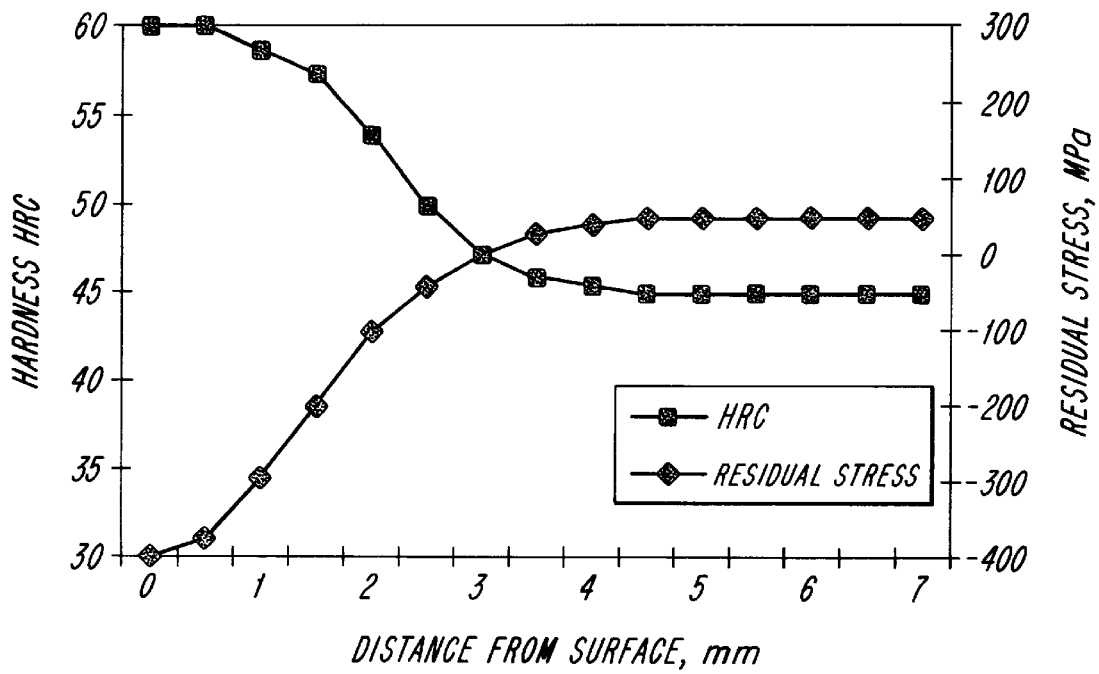
FIG. 1 shows a schematic representation of the hardness and residual stress obtained from the surface inwards of a component subject to case-hardening.
Figure 2:
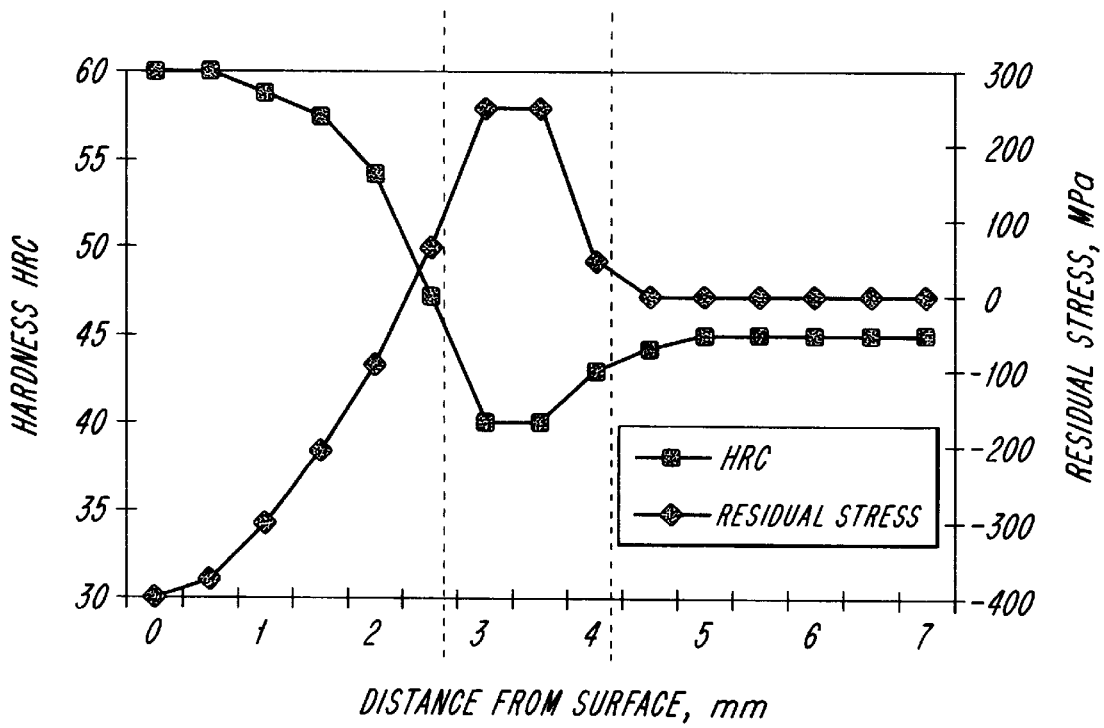
FIG. 2 shows a schematic representation of the hardness and residual stress of a low-alloyed steel containing 0.5%–0.6% C subject to induction heating.

By using such a steel, it is possible to control and adjust the carbon content in the core by means of a sufficiently high content of the carbide-forming alloy element, such as chromium. By using this alloyed steel with a particular induction heating, whereby the core is heated to a temperature just within the austenitic region, normally 800°–1000° C., so that a predetermined dissolved carbon content is reached, and rapidly heating the surface layer to a high temperature in the austenitic region, normally 900°–1200° C., there is obtained, after quenching, a dissolved carbon content profile throughout the component, which is the same as obtained by case-carburizing, i.e., as shown in FIG. 1, however without the drawbacks of the case-carburizing process described above. Preferably, the heating of the core is made prior to the heating of the surface layer, but it is possible to obtain the same result by reversing this procedure.

Thus the process according to the invention reaches the goals set by using a certain material, e.g., a chromium steel having 0.3%–1.2% C and 1%–25% Cr, together with a certain heat treatment procedure by which the component is austenitized throughout. However, the core and surface of the component are subjected to different temperature cycles and have different carbon contents.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for the production of a steel component having a hard, carbon rich surface and a tough, low carbon core comprising induction heating, then quenching, a component formed from an alloyed steel with a carbon content of 0.3%–1.2% C and containing a strong carbide former so that the core is heated to the lower region of the austenite area during a first induction heating step, thereby creating a certain dissolved carbon level in the component core, and heating the surface region to a higher region within the austenite area during a second induction heating step, thereby creating a high dissolved carbon content in the surface region of the component.

2. The process of claim 1 wherein the core area of the component is induction heated to a temperature between 800°–1000° C. in the first induction heating step.

3. The process of claim 1 wherein the surface area of the component is rapidly induction heated to a temperature of about 900°–1200° C. in the second induction heating step.

4. The process of claim 2 wherein the surface area of the component is rapidly induction heated to a temperature of about 900°–1200° C. in the second induction heating step.

5. The process of claim 1 wherein the strong carbide former is chromium.

6. The process of claim 5 wherein the chromium is present in an amount of 1%–25%.

7. The process of claim 1, wherein the first induction heating step is conducted prior to the second induction heating step.

8. The process of claim 1, wherein the second induction heating step is conducted prior to the first induction heating step.

* * * * *